United States Patent
Phillips et al.

(10) Patent No.: US 6,991,192 B2
(45) Date of Patent: Jan. 31, 2006

(54) APPARATUS FOR ADAPTING WASTE DISPOSAL PUMP TO WASTE DISCHARGE PORTS OF RV'S, RV PARK SYSTEMS, TRAINS, AIRPLANES, BUSES, BOATS AND PORTABLE TOILET APPLICATIONS, FOR EASY AND SANITARY DISPOSAL OF WASTE HOLDING TANKS

(75) Inventors: David L. Phillips, Santa Ana, CA (US); Gerard K. Caldwell, Corona, CA (US); Rufino Naval, Jr., San Juan Capistrano, CA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 84 days.

(21) Appl. No.: 10/426,416

(22) Filed: Apr. 30, 2003

(65) Prior Publication Data
US 2004/0129807 A1 Jul. 8, 2004

Related U.S. Application Data

(60) Provisional application No. 60/438,497, filed on Jan. 7, 2003.

(51) Int. Cl.
*B02C 23/36* (2006.01)

(52) U.S. Cl. .................................. 241/46.01

(58) Field of Classification Search ............ 241/46.01, 241/46.02, 46.017; 4/DIG. 4
See application file for complete search history.

(56) References Cited

U.S. PATENT DOCUMENTS

| | | | |
|---|---|---|---|
| 2,718,012 A | 9/1955 | Howe | |
| 3,699,592 A | 10/1972 | Minchak | |
| 3,878,569 A | 4/1975 | Peirish, Jr. et al. | |
| 4,032,995 A * | 7/1977 | Kemper | .................. 4/319 |
| 4,133,347 A | 1/1979 | Mercer | |
| 4,736,968 A | 4/1988 | Glegg | |
| 4,844,121 A | 7/1989 | Duke | |
| 4,846,212 A | 7/1989 | Scobie et al. | |
| 5,141,017 A | 8/1992 | Trottier | |
| 5,987,658 A | 11/1999 | Richards et al. | |
| 6,029,707 A | 2/2000 | Couch | |
| 6,352,088 B1 | 3/2002 | Stegall | |
| 6,427,715 B1 | 8/2002 | Brockington et al. | |

\* cited by examiner

*Primary Examiner*—Mark Rosenbaum
(74) *Attorney, Agent, or Firm*—Ware, Fressola, Van Der Sluys & Adolphson

(57) ABSTRACT

The present invention provide a new and unique macerator assembly or device for coupling and decoupling to a waste disposal port of a holding tank of a recreational vehicle, train, airplane, bus, boat or other portable toilet application for emptying the same. The macerator assembly includes a pump head adaptor and a macerator pump subassembly. The pump head adaptor has means for coupling the macerator device to the waste disposal port of the holding tank, and has a pump head inlet adapter with a garden hose adapter arranged therein for receiving water from a garden hose for flushing the holding tank. The macerator pump subassembly is coupled to the pump head adapter, has an in-take port for receiving waste from the holding tank through the pump head adaptor, has a rotary blade for chopping the waste, and has a discharge port for discharging the waste to a suitable discharge waste repository.

14 Claims, 4 Drawing Sheets

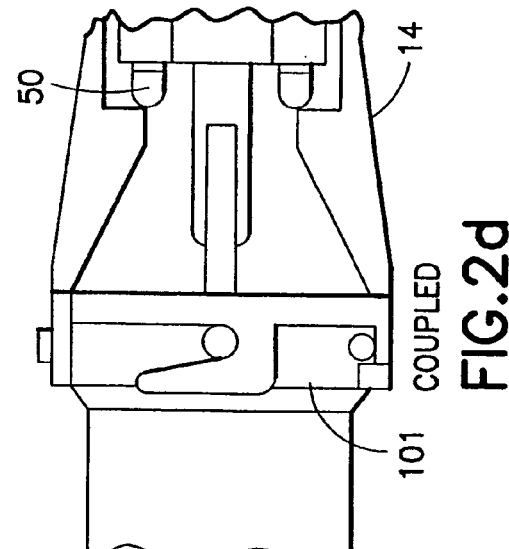
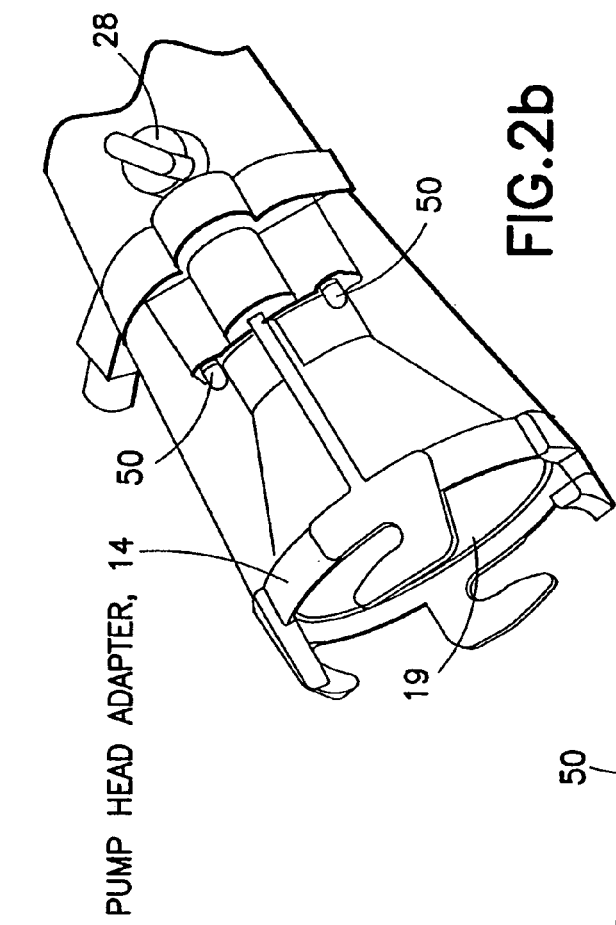
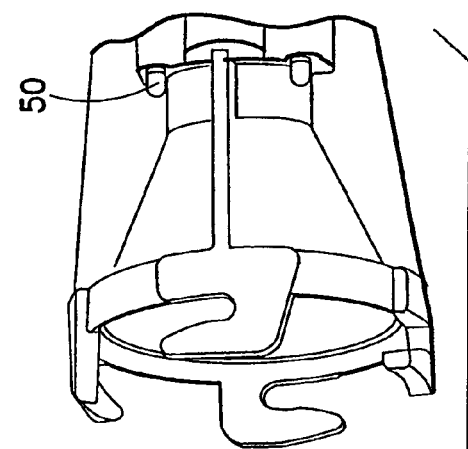
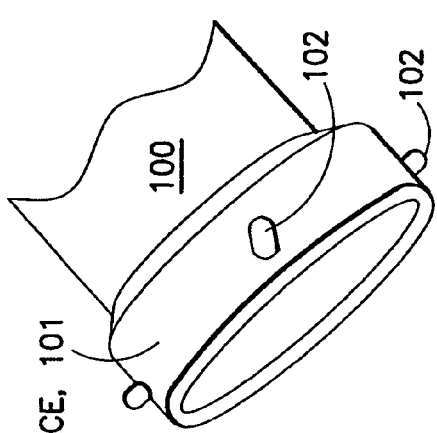
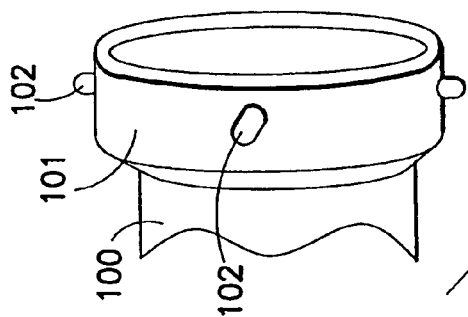

APPARATUS FOR ADAPTING WASTE DISPOSAL PUMP TO WASTE DISCHARGE PORTS OF RV'S, RV PARK SYSTEMS, TRAINS, AIRPLANES, BUSES, BOATS AND PORTABLE TOILET APPLICATIONS, FOR EASY AND SANITARY DISPOSAL OF WASTE HOLDING TANKS

CROSS REFERENCE TO RELATED APPLICATIONS

This application claims benefit to provisional patent application Ser. No. 60/438,497, filed Jan. 7, 2003, hereby incorporated by reference.

BACKGROUND OF THE INVENTION

1. Technical Field

This invention relates to a macerator device; and more particularly to a macerator device for coupling on a waste discharge port of a waste holding tank of a recreational vehicle (RV), train, airplane, bus, boat and other portable toilet.

2. Description of Related Art

One known device is disclosed in Stegall (U.S. Pat. No. 6,352,088) and is a fully automated system that is installed on an RV that uses a macerator pump to evacuate the waste. Another similar device is a macerator pump with hoses and adapters clamped to the pump. Both of the above units require certain procedures to back flush the system.

The Stegall fully automated device requires a compartment, as it is usually permanently installed on the RV. There are also several connections in the installation where there is a higher possibility of a leak occurring. The other device mentioned also has several points in the unit itself where leaks may occur.

Other known devices include Mercer (U.S. Pat. No. 4,133,347), Glegg (U.S. Pat. No. 4,736,968), Trottier (U.S. Pat. No. 5,141,017), and Brockington (U.S. Pat. No. 6,427,715), which all disclose RV holding tank adapters, but not a way for macerating waste before discharging it. Glegg, Trottier and Brockington also disclose backflushing and evacuating waste from a holding tank. However, none of these patents disclose a way for coupling a holding tank adapter to a holding tank for providing a combined backflushing and chopping of waste.

Other patents disclose different types of toilet assemblies having macerating or chopping devices. For example, Howe (U.S. Pat. No. 2,718,012) discloses a self-contained toilet unit having disintegrator blades; Minchak (U.S. Pat. No. 3,699,592) discloses a marine toilet having an auger-type blade; Peirish, Jr. et al. (U.S. Pat. No. 3,878,569) discloses a sewage treatment device having a macerator having a macerator element; and Richards et al. (U.S. Pat. No. 5,987,658) discloses a marine toilet having a macerator blade. However, similar to that discussed above, none of these patents disclose a way for adapting such macerating devices for providing a combined backflushing and chopping of the waste from a holding tank.

SUMMARY OF THE INVENTION

The present invention provide a new and unique macerator assembly or device for coupling and decoupling to a waste disposal port of a holding tank of a recreational vehicle, train, airplane, bus, boat or other portable toilet application for emptying the same. The macerator assembly includes a pump head adaptor in combination with a macerator pump subassembly. The pump head adaptor has means for coupling the macerator device to the waste disposal port of the holding tank. The macerator pump subassembly is coupled to the pump head adapter, has an in-take port for receiving waste from the holding tank through the pump head adaptor, has a rotary blade for chopping the waste, and has a discharge port for discharging the waste to a suitable discharge waste repository.

The means for coupling includes a set of fingers with respective finger slots for rotatably coupling the macerator device to the waste disposal port of the holding tank.

The pump head adaptor has a pump head inlet adapter having a garden hose adapter arranged therein for receiving water from a garden hose for flushing the holding tank. The garden hose adapter may include an on/off flush valve for turning the water on/off while flushing the holding tank, as well as a check valve arranged therein for preventing the backflow of effluent from the waste holding tank into the garden hose.

The in-take port of the macerator pump subassembly has a set of bolts extending therefrom, each with a respective thread on an end thereof. The pump head adaptor has an output end with a plurality of channels, each bolt passing through a respective channel. The macerator device includes a set of nuts, each nut coupled to a respective thread for coupling the pump head adaptor and macerator pump subassembly together.

The pump head adaptor has an input end with an O-ring arranged in a circumferentail groove or ledge on an interior surface thereof for providing a seal and frictional resistance between the pump head adaptor and the waste disposal port of the holding tank when coupled together.

The pump head adapter has a conical interior surface for funneling the waste into the macerator pump subassembly.

The macerator pump subassembly has an inlet port for receiving a fluid for cleaning the rotary blade.

In operation, the macerator pump inlet is mounted directly to the mating face of the waste outlet, such as an RV waste outlet. According to the present invention, there is only one connection between the macerator pump and the RV waste outlet.

The overall unit consists of the macerator pump with a built-in inlet that connects directly to the RV waste outlet. A wiring harness connects the pump to power and a switch to turn the power on.

BRIEF DESCRIPTION OF THE DRAWING

The drawing includes FIGS. 1–4, as follows:

FIG. 2a is view of a mating face of a waste discharge port.

FIG. 2b is view of a pump head adapter that is the subject matter of the present invention.

FIG. 2c is view of the mating face shown in FIG. 2a face-to-face with the pump head adapter shown in FIG. 2b.

FIG. 2d is view of the mating face shown in FIG. 2a coupled to the pump head adapter shown in FIG. 2b.

DESCRIPTION OF THE INVENTION

Figure 1:
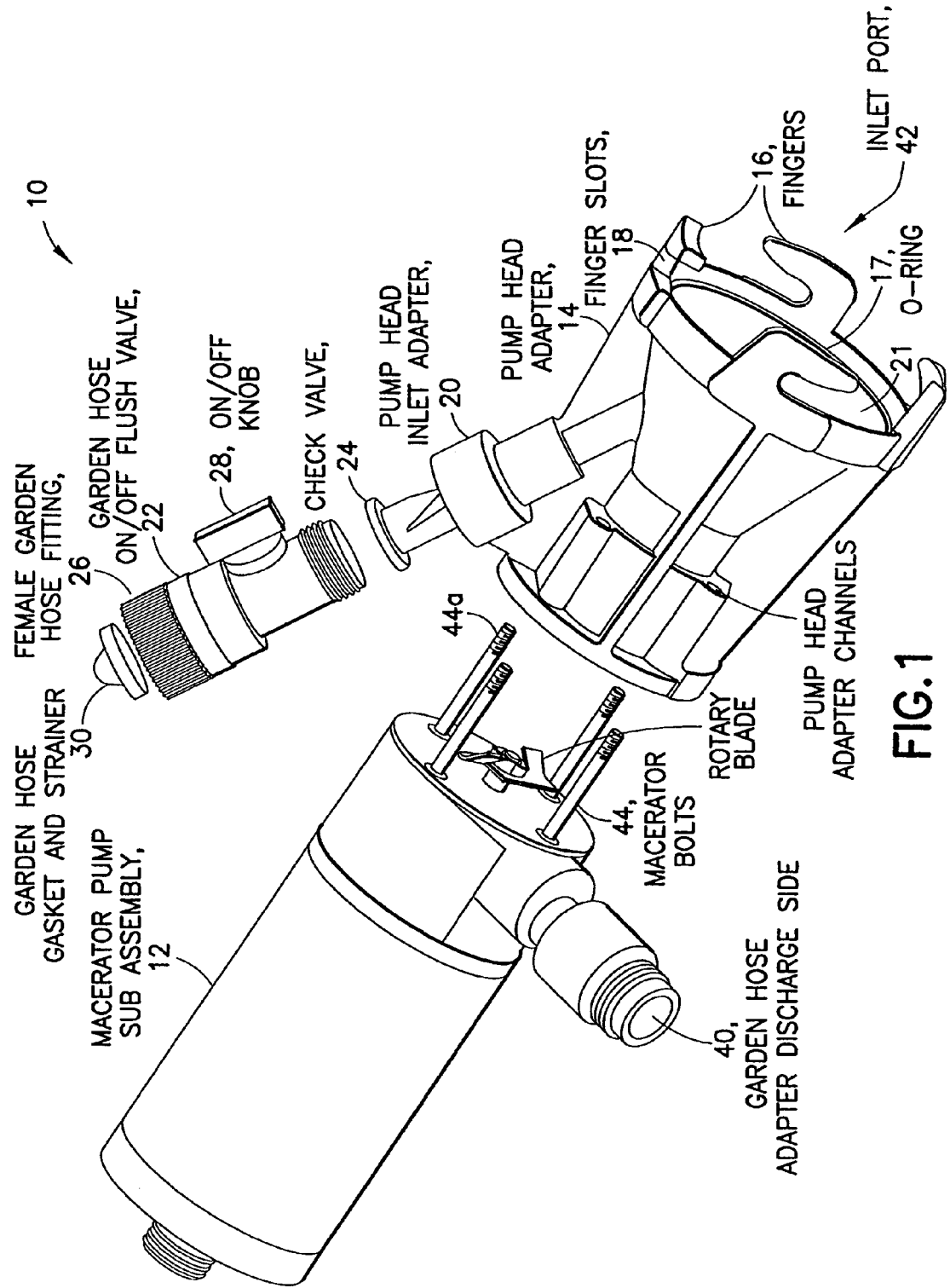
FIG. 1 is a perspective view of the overall macerator device, including a macerator pump subassembly and a pump head adapter that is the subject matter of the present invention.
Figure 3:
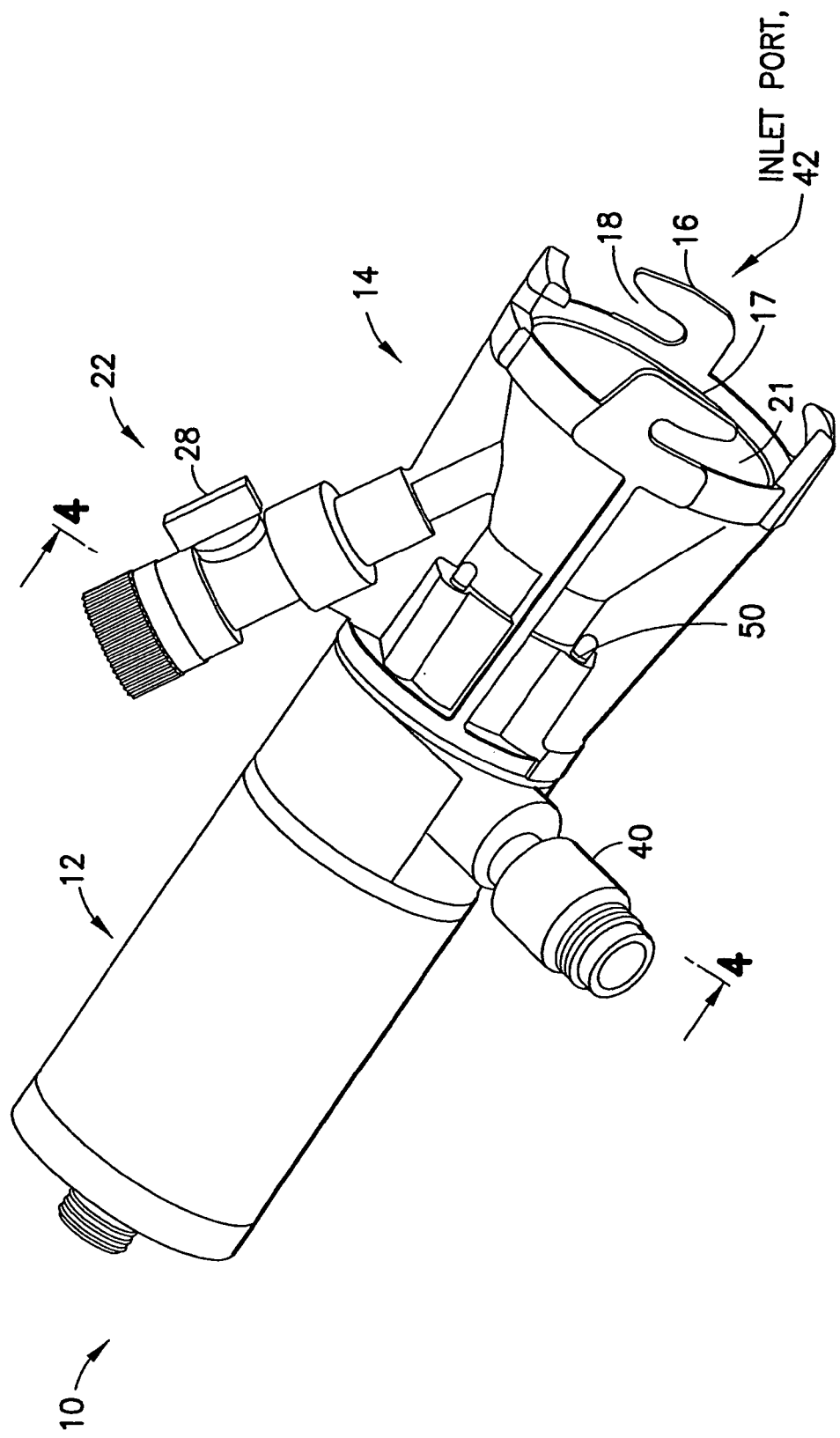
FIG. 3 is a perspective view of an assembled macerator device.

FIGS. 1 and 3 shows a macerator assembly generally indicated as 10 that is the subject matter of the present invention. The macerator device 10 is coupled to a mating face 101 of a waste discharge port generally indicated as 100 shown in FIGS. 2a, 2c, 2d. The mating face 101 is a part of a holding tank (not shown) in an RV, boat, bus, train, airplane (all not shown), etc. The holding tank typically contains waste that must be disposed of from time to time. The macerator device 10 may be temporarily attached to the mating face 101 for discharging the waste from the holding tank and then removed once the waste is discharged. The scope of the invention is also intended to include permanently mounting the macerator device 10 in such an RV, boat, bus, train, or airplane. The invention is described in relation to use in an RV, although the scope of the invention is not intended to be limited to any particular use of the macerator device 10.

The macerator device 10 includes two basic components, i.e. a macerator pump subassembly 12 in combination with a pump head adapter 14. The pump head adapter 14 couples the macerator pump subassembly 12 to the mating face 101 shown in FIGS. 2a, 2c, 2d. FIGS. 2c and 2d respectively show the pump head adapter 14 face-to-face and coupled to the mating face 101 and attached to the macerator pump subassembly 12. The pump head adapter 14 has fingers 16 with corresponding slots 18 for coupling to nubs or protuberances 102 on the mating face 101 in FIGS. 2a, 2b, 2d. The pump head adapter 14 also has an O-ring 17 for providing a seal and frictional resistance between the pump head adapter 14 and the mating face 101. The O-ring 17 may be arranged in a circumferential groove or on a ledge 19 (FIG. 2b) on a conical interior surface 21 of the pump head adapter 14.

The pump head adapter 14 also has a pump head inlet adapter 20 for coupling a garden hose (not shown) via a garden hose on/off flush valve 22 and an optional check valve 24. The garden hose on/off flush valve 22 has a female garden hose fitting 26 for receiving an end of the garden hose (not shown) and an on/off knob 28. A garden hose gasket and strainer 30 may also be fitted into the female garden hose fitting 26. In operation, the garden hose may be coupled to the pump head inlet adapter 20 for providing water into the holding tank for cleaning the same out periodically. For example, the pump head inlet adapter 20 allows the garden hose to hook up on to the pumphead for flushing while disposing of waste and allow the operator to back flush waste tanks with fresh water. The check valve 24 prevents waste or effluent from backflowing into the garden hose.

The macerator pump subassembly 12 also has a garden hose adapter discharge side 40 for discharging the waste or effluent. The garden hose adapter discharge side 40 provides a quick and easy way to discharge the waste into a suitable discharge waste repository. The macerator pump subassembly 12 also has an inlet port 42 for providing a fluid such as fresh water into the interior cavity of the macerator pump subassembly 12 for cleaning build-up and/or dried residue that may form inside the same between uses. The macerator pump subassembly 12 also has a rotary blade 46 for chopping up the waste or effluent from the holding tank (not shown).

The macerator pump subassembly 12 is coupled to the pump head adapter 12 by a set of bolts 44 having corresponding threads 44a. The bolts 44 respectively pass through pump head adapter channels 15 and are held in place by acorn nuts 50 shown in FIGS. 2b, 2c, 2d, 3 and 8. The scope of the invention is not intended to be limited to any particular way of coupling the coupling macerator pump subassembly 12 to the pump head adapter 12; embodiments are envisioned using many different types of coupling techniques.

Figure 4:
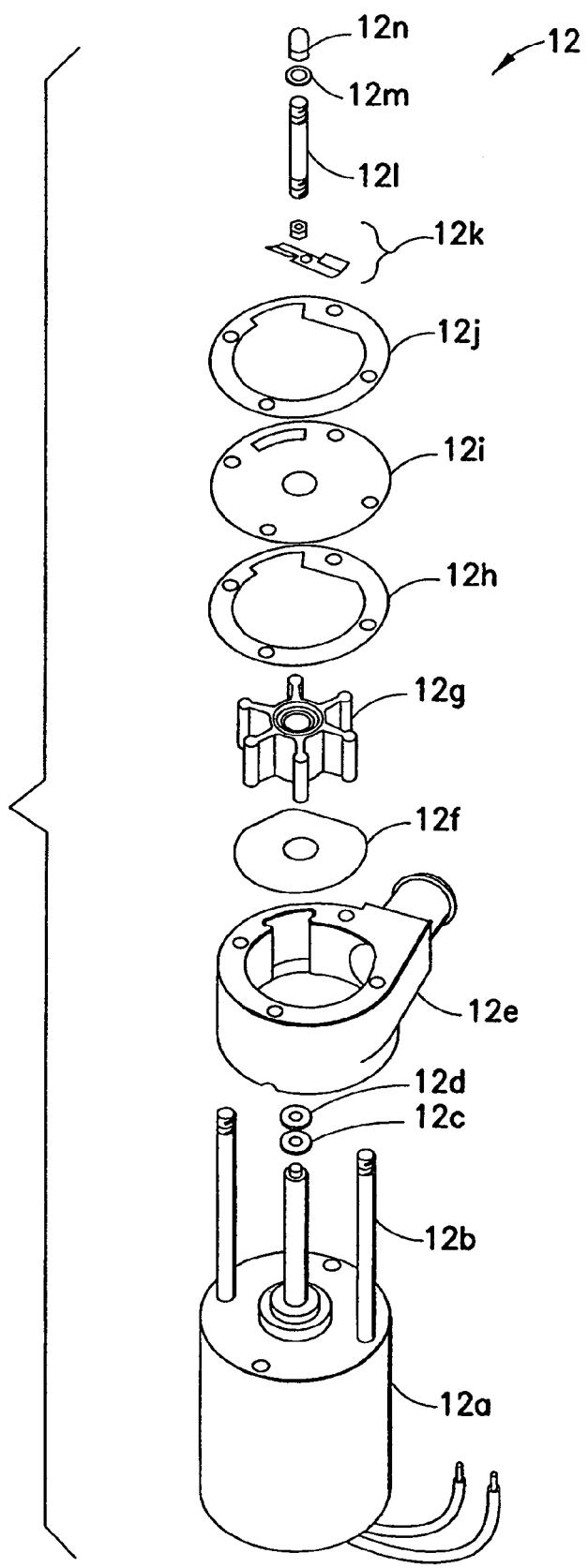
FIG. 4 shows an exploded view of a macerator pump subassembly.

FIG. 4 show an exploded view of the macerator pump subassembly 12, which includes a motor subassembly 12a, bolts or studs 12b, a slinger 12c, a seal 12d, a body 12e, a wearplate 12f, an impeller 12g, a gasket 12h, a wear plate 12i, a gasket 12j, a chopper plate with locknut 12k, a stud 12l, a fiber washer 12m and an acorn nut 12n.

The macerator pump subassembly 12 is shown and described by way of example. The scope of the invention is not intended to be limited to any particular type or kind of macerator pump subassembly 12.

SCOPE OF THE INVENTION

Although the invention has been described and illustrated with respect to exemplary embodiments thereof, the foregoing and various other additions and omissions may be made therein and thereto without departing from the spirit and scope of the present invention.

What is claimed is:

1. A macerator device for quickly, easily and temporarily coupling and decoupling to a waste disposal port of a holding tank of a recreational vehicle, train, airplane, bus, or boat for emptying the same, comprising:
   a pump head adaptor having means for frictionally engaging and detachably coupling the macerator device to the waste disposal port of the holding tank; and
   a macerator pump subassembly being coupled to the pump head adapter, having an in-take port for receiving waste from the holding tank through the pump head adaptor, having a rotary blade for chopping the waste, and having a discharge port for discharging the waste to a suitable discharge waste repository, the means for coupling including a plurality of fingers with respective finger slots for rotatably coupling the macerator device to the waste disposal port of the holding tank.

2. A macerator device according to claim 1, wherein the macerator device further comprises a pump head inlet adapter having a garden hose adapter arranged therein for receiving water from a garden hose for flushing the holding tank.

3. A macerator device according to claim 2, wherein the garden hose adapter includes an on/off flush valve for turning the water on/off while flushing the holding tank.

4. A macerator device according to claim 2, wherein the garden hose adapter has a check valve arranged therein.

5. A macerator device according to claim 1, wherein the pump head adaptor has an input end with an O-ring arranged in a circumferential groove or ledge on an interior surface thereof for providing a frictional engagement and seal between the pump head adaptor and the waste disposal port of the holding tank when coupled together.

6. A macerator device according to claim 1, wherein the pump head adapter has a conical interior surface for funneling waste into the macerator pump subassembly.

7. A macerator device according to claim 1, wherein the macerator pump subassembly has an inlet port for receiving a fluid for cleaning the rotary blade.

8. A macerator device for quickly, easily and temporarily coupling and decoupling to a waste disposal port of a holding tank of a recreational vehicle, train, airplane, bus, or boat for emptying the same, comprising:

a pump head adaptor having means for frictionally engaging and detachably coupling the macerator device to the waste disposal port of the holding tank;

a macerator pump subassembly being coupled to the pump head adapter, having an in-take port for receiving waste from the holding tank through the pump head adaptor, having a rotary blade for chopping the waste, and having a discharge port for discharging the waste to a suitable discharge waste repository;

the in-take port of the macerator pump subassembly including a plurality of bolts extending therefrom, each with a respective thread on an end thereof;

the pump head adaptor having an output end with a plurality of channels, each bolt passing through a respective channel; and the macerator device including a plurality of nuts, each nut coupled to a respective thread for coupling the pump head adaptor and macerator pump subassembly together.

9. A macerator device for quickly, easily and temporarily coupling and decoupling to a waste disposal port of a holding tank of a recreational vehicle, train, airplane, bus, or boat for emptying the same, comprising:

a pump head adaptor having means for frictionally engaging and detachably coupling the macerator device to the waste disposal port of the holding tank, and having a pump head inlet adapter with a garden hose adapter arranged therein for receiving water from a garden hose for flushing the holding tank; and a macerator pump subassembly being coupled to the pump head adapter, having an in-take port for receiving waste from the holding tank through the pump head adaptor, having a rotary blade for macerating the waste, having an inlet port for receiving a fluid for cleaning the rotary blade, and having a discharge port for discharging the waste to a suitable discharge waste repository, the means for coupling including a plurality of fingers with respective finger slots for rotatably coupling the macerator device to the waste disposal port of the holding tank.

10. A macerator device according to claim 9, wherein the garden hose adapter includes an on/off flush valve for turning the water on/off while flushing the holding tank.

11. A macerator device according to claim 9, wherein the garden hose adapter has a check valve arranged therein.

12. A macerator device according to claim 9, wherein the pump head adaptor has an input end with an O-ring arranged therein for providing a frictional engagement and seal between the pump head adaptor and the waste disposal port of the holding tank when coupled together.

13. A macerator device according to claim 9, wherein the pump head adapter has a conical interior surface for funneling waste into the macerator pump subassembly.

14. A macerator device for quickly, easily and temporarily coupling and decoupling to a waste disposal port of a holding tank of a recreational vehicle, train, airplane, bus, or boat for emptying the same, comprising:

a pump head adaptor having means for frictionally engaging and detachably coupling the macerator device to the waste disposal port of the holding tank, and having a pump head inlet adapter with a garden hose adapter arranged therein for receiving water from a garden hose for flushing the holding tank;

a macerator pump subassembly being coupled to the pump head adapter, having an in-take port for receiving waste from the holding tank through the pump head adaptor, having a rotary blade for macerating the waste, having an inlet port for receiving a fluid for cleaning the rotary blade, and having a discharge port for discharging the waste to a suitable discharge waste repository;

the in-take port of the macerator pump subassembly including a plurality of bolts extending therefrom, each with a respective thread on an end thereof;

the pump head adaptor having an output end with a plurality of channels, each bolt passing through a respective channel; and the macerator device including a plurality of nuts, each nut coupled to a respective thread for coupling the pump head adaptor and macerator pump subassembly together.

* * * * *

UNITED STATES PATENT AND TRADEMARK OFFICE
CERTIFICATE OF CORRECTION

| | |
|---|---|
| PATENT NO. | : 6,991,192 B2 |
| APPLICATION NO. | : 10/426416 |
| DATED | : January 31, 2006 |
| INVENTOR(S) | : David L. Phillips, Gerard K. Caldwell and Rufino Naval, Jr. |

It is certified that error appears in the above-identified patent and that said Letters Patent is hereby corrected as shown below:

In column 2, line 31 "circumferentail" should be --circumferential--

Signed and Sealed this

Ninth Day of October, 2007

JON W. DUDAS
*Director of the United States Patent and Trademark Office*